(12) United States Patent
James et al.

(10) Patent No.: US 8,705,792 B2
(45) Date of Patent: Apr. 22, 2014

(54) OBJECT TRACKING USING LINEAR FEATURES

(75) Inventors: Michael Robert James, Northville, MI (US); Dmitri A. Dolgov, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1129 days.

(21) Appl. No.: 12/186,581

(22) Filed: Aug. 6, 2008

(65) Prior Publication Data

US 2010/0034422 A1    Feb. 11, 2010

(51) Int. Cl.
*G06K 9/00*    (2006.01)

(52) U.S. Cl.
USPC ............................ 382/103; 348/169; 700/245

(58) Field of Classification Search
USPC ............................ 382/103; 348/169; 700/245
See application file for complete search history.

(56) References Cited

U.S. PATENT DOCUMENTS

| | | | |
|---|---|---|---|
| 5,988,862 A * | 11/1999 | Kacyra et al. ..................... | 703/6 |
| 6,173,066 B1 | 1/2001 | Peurach et al. | |
| 6,677,941 B2 | 1/2004 | Lin | |
| 6,766,037 B1 | 7/2004 | Le et al. | |
| 6,775,396 B2 * | 8/2004 | Matsunaga .................... | 382/106 |
| 6,826,293 B2 * | 11/2004 | Matsunaga .................... | 382/106 |
| 7,003,136 B1 * | 2/2006 | Harville ........................ | 382/103 |
| 7,054,505 B2 | 5/2006 | Shyu | |
| 7,218,758 B2 * | 5/2007 | Ishii et al. ..................... | 382/104 |
| 7,317,417 B2 | 1/2008 | Arikan et al. | |
| 7,386,163 B2 * | 6/2008 | Sabe et al. ..................... | 382/153 |
| 7,539,557 B2 * | 5/2009 | Yamauchi ..................... | 700/245 |
| 7,659,835 B2 * | 2/2010 | Jung .......................... | 340/932.2 |
| 7,706,944 B2 * | 4/2010 | Tanaka et al. .................. | 701/41 |
| 7,720,580 B2 * | 5/2010 | Higgins-Luthman ........... | 701/28 |
| 7,865,267 B2 * | 1/2011 | Sabe et al. ..................... | 700/245 |
| 2007/0058838 A1 * | 3/2007 | Taniguchi ..................... | 382/103 |
| 2008/0027591 A1 * | 1/2008 | Lenser et al. .................... | 701/2 |
| 2011/0116684 A1 * | 5/2011 | Coffman et al. ............... | 382/103 |

OTHER PUBLICATIONS

Okada et al., "Obstacle Detection Based on Motion Constraint of Virtual Planes", Proceedings of the 2002 IEEURSI Intl. Conference on Intelligent Robots and Systems, 61-66.*
Rabbani et al., "Segmentation of Point Clouds Using Smoothness Constraint",2006, ISPRS Commission V Symposium 'Image Engineering and Vision Metrology, 248-253.*
Kwon et al., "Fitting range data to primitives for rapid local 3D modeling using sparse range point clouds", 2004, Automation in Construction, 67-81.*
Vaskevicius et al., "Fast Detection of Polygons in 3D Point Clouds from Noise-Prone Range Sensors", 2007, Proceedings of the 2007 IEEE International Workshop on Safety, Security and Rescue Robotics.*

* cited by examiner

*Primary Examiner* — Bhavesh Mehta
*Assistant Examiner* — Katrina Fujita
(74) *Attorney, Agent, or Firm* — Gifford, Krass, Sprinkle, Anderson & Citkowski, P.C.

(57) ABSTRACT

A method of tracking objects within an environment comprises acquiring sensor data related to the environment, identifying linear features within the sensor data, and determining a set of tracked linear features using the linear features identified within the sensor data and a previous set of tracked linear features, the set of tracked linear features being used to track objects within the environment.

15 Claims, 10 Drawing Sheets

OBJECT TRACKING USING LINEAR FEATURES

FIELD OF THE INVENTION

The present invention relates to image analysis, including representation and tracking of obstacles within an environment using sensor data.

BACKGROUND OF THE INVENTION

Object tracking within an environment is useful for a variety of applications, including the operation of robotic vehicles. However, conventional object tracking using different object models for each type of identified object is computationally difficult.

SUMMARY OF THE INVENTION

Examples of the present invention relate to methods and apparatus for tracking objects using linear features derived from range data. For example, linear features may include linear features identified within 2D or 3D sensor data, for example lines or planes identified within sensor data. In examples below, identification and tracking of linear features such as lines are described in specific examples of the invention, but examples of the invention also include identification and tracking of other linear features such as planes.

In example approaches, linear features (such as lines and/or planes) are identified within sensor data. For example, line segments may be identified in 2D sensor data, and planes may be identified within 3D data. Sensor data may include range data, such as range data obtained using lidar, radar, sonar, other electromagnetic radiation based approaches, ultrasound, or other approach. The linear features are tracked, allowing object tracking within the environment. Objects need not be identified, and in some approaches a similar dynamic model can be used for all tracked linear features. Linear features may represent both static and dynamic objects.

In some examples of linear feature identification, a locally adaptive linear feature detection algorithm is used to detect linear features within sensor data, such as image data or range data, and linear feature data from the linear feature detection algorithm are provided to linear feature tracker. In example approaches, for each data point a set of nearest neighbors is found and a normal vector is estimated using the set of nearest neighbors. A residual or other measure of likely error is estimated for the normal vector calculation. Data points are then clustered into linear features. Clustering occurs for data points that have a small distance from each other (or which can be interconnected through other data points within a cluster), and which have a similar normal vector. Clustering may start with data points having smaller residuals for the normal calculation, as may be more likely to be part of a linear feature. Examples of the present invention further include novel linear feature algorithms used without subsequent line tracking, for example improved linear feature identification within image data for other applications.

An example approach to tracking of linear features includes acquiring sensor data, identifying linear features within the sensor data, and creating a set of tracked linear features using the linear features identified in the sensor data. A present set of tracked linear features may include the linear features identified in the sensor data, and may further include linear features obtained from a previous set of tracked linear features even if these were not detected in present sensor data. Hence, linear features, and corresponding objects represented by these linear features, may persist within the representation of the environment even if corresponding linear features are not detected within the present sensor data.

The following example refers to line segments (lines), but may also be implemented for planes. Lines detected within present sensor data may be referred to as new lines, and lines within a previous set of tracked lines may be referred to as old lines. The old lines are marked as untracked. For each new line, a mapping of each old line to the new line is found, and a mapping probability is determined. For example, if an old line is in the same general location as the new line, and is the same length and orientation, the mapping probability is relatively high. The highest probability mapping from an old line to the new line is identified, and this correspondence between old and new lines can be used for line tracking. For example, if the highest probability is above a predetermined threshold, the new line is identified as being tracked from the old line, and the old line is marked as tracked. The probability of the new line is determined, for example in terms of linearity and/or mapping probability if appropriate. The new set of tracked lines hence may include new lines that were tracked from old lines, and may also include new lines that do not appear to correspond to old lines (such as new objects within the environment).

For each of any untracked old lines, the associated line probability (more generally, a feature probability for a linear feature) is decreased relative to the corresponding line probability used within the set old lines, and the old lines can then be included into the new set of tracked lines as long as the reduced line probability remains above a predetermined threshold. For example, if a previously detected line is not detected within subsequent sensor data, the line may remain within subsequent sets of tracked objects but with a line probability that falls with each subsequent failure to detect a corresponding line. The previously detected line may be removed from a present set of tracked lines (or not passed through to the present set) when the line probability falls below a threshold probability. A suitable threshold probability can be determined empirically through testing or simulation of an algorithm.

Tracking can occur for both static and dynamic obstacles simultaneously. A linear feature representation of an environment can further be used for other purposes, such as improved ray-tracing of a dynamic obstacle map by providing additional knowledge of the presence and absence of obstacles within the environment.

In example approaches, for every set of new sensor data, new linear features (identified within the new sensor data) are integrated with a previous set of tracked linear features, giving an updated picture of the objects in the world in the form of linear features. The sensor data may be in the form of 2D or 3D points, such as range data, for example distance and orientation relative to the sensor or vehicle supporting the sensor. There may be a plurality of sensors.

Linear features are obtained from the sensor data, for example using a locally adaptive algorithm that adjusts its parameters for finding linear features based on the distribution of points encountered. This approach is particularly useful for sensors that return relatively sparse data, for example in many outdoor environments. The linear features are then passed to a linear feature tracker, which integrates the new linear features with an existing set of linear features. This allows a probabilistic mapping from old linear features to newly identified linear features, allows the introduction of new linear features, as well as the persistence of linear features that are not measured due to noise or obstruction. The latter corresponds to the notion of object permanence. The output of this step is the updated set of linear features. This process can be repeated for each new set of sensor readings.

DETAILED DESCRIPTION OF THE INVENTION

Figure 1:
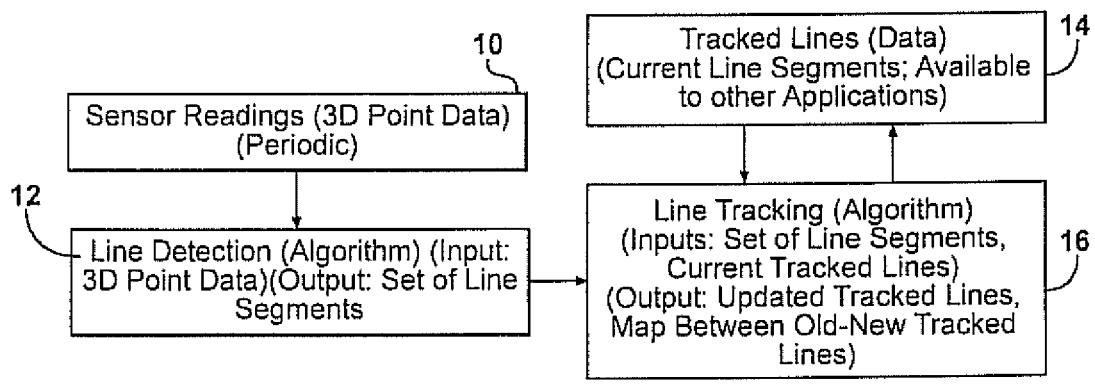
FIG. 1 illustrates an example approach for linear feature tracking.

Examples of the present invention relates to apparatus and methods of tracking objects using range data. An example approach comprises identifying linear features from range data, and then tracking those linear features. A linear feature detecting algorithm (such as a linear feature detecting algorithm) may be locally adaptive in that it adjusts its parameters for finding linear features based on the distribution of points that the algorithm encounters. The output of the algorithm can be used to help track linear features and hence objects within the environment. A similar motion model can be used for all tracked linear features regardless of the identity of the object tracked, allowing computational simplicity in object tracking and further making object identification not necessary for object tracking.

A higher-level representation (e.g. linear features such as lines or planes instead of point data) can be used to improve the performance of other algorithms, including ray-tracing algorithms used to identify obstacles.

Examples of the invention provide apparatus and methods for tracking objects within an environment. Such information is useful for a variety of purposes including path planning (for example, for automated vehicles and other robots), collision detection, pre-crash warning systems, and the like. The objects may be measured using range data obtained using one or more sensors, such as radar, laser range finders, and the like. A sensor may generate range data (e.g. 3D points) corresponding to objects in the environment, but conventional sensors alone do not provide the capability for tracking objects over time.

Conventional object tracking approaches (such as Kalman filtering and particle filtering) rely on building of motion and observation models for the objects being tracked. These models are typically very specific to particular objects and sensors, and different models may be needed for each possible type of object. This may be impractical for many applications.

A general purpose geometric primitive can be used to represent objects within the environment. The geometric primitive may be a linear feature such as a line or plane. In some examples, a geometric primitive representation of an environment may include one or more of the following: lines, curve segments (such as arcs, parabolas, and the like), geometric shapes such as rectangles, circles, and the like, or shapes representative of typical objects in an environment.

Objects tracked in an environment may include vehicles, roads, shrubbery, persons, animals, and the like. The objects may be static or dynamic, or vary between static and dynamic states.

In some examples, the geometric primitive takes the form of a linear feature. This primitive has the advantage that a single motion and observation model can be used for all objects, which improves its general applicability over typical approaches in robotics. Representation of objects using linear features such as lines and/or planes allows detection and tracking to be performed without prior models of all objects. Further, the identification of linear features from range data can be accomplished using a novel method that improves on typical linear feature detection (for instance the Hough transform) used for 2D camera images.

Novel algorithms were developed for linear feature detection and for tracking of linear features. These algorithms were tested on 3D point data from laser range finders for finding and tracking objects in a parking lot environment, including the tracking of cars, buses, and stationary objects like buildings and walls, and excellent results were obtained.

In a representative approach, probabilistic mapping from a linear feature at one time step to a linear feature at the next step is used within a Bayesian framework. An algorithm is used for finding and using linear features as primitives for processing data, such as sensor data. Linear features are simple enough to allow for relatively efficient detection algorithms, but are sophisticated enough to allow tracking of dynamic obstacles over time using a single model of the movement and measurement of linear features. Such a parametric representation of the environment is well suited to deal with the noise inherent in dynamic, real-world environments.

A linear feature tracker can be used to track linear features within the output from a locally-adaptive linear feature detection algorithm. Both static and dynamic obstacles can be tracked simultaneously using a single model of object dynamics.

Examples of the present invention include methods of identifying linear features from range data, and may also include improved segment-tracking methods, and using a segment-detection algorithm and/or segment tracking algorithm to track objects. Examples of the present invention use low-level primitives, such as linear features, that can be simple enough to allow computationally efficient processing, while at the same time providing a rich enough higher-level representation (compared with point data) to support algorithms such as tracking algorithms. A higher-level representation, such as the use of linear features, can aid other algorithms such as ray tracing algorithms, path planning algorithms, and the like.

A locally-adaptive algorithm for linear feature detection is well-suited to the noisy and sparse data coming from outdoor, dynamic, real-world environments. A probabilistic tracking algorithm for linear features is able to track both static and dynamic obstacles. Experimental results indicated that using linear feature based representations is generally advantageous. Linear feature based representations have enough representational power to successfully perform tasks such as dynamic tracking that are useful to interpreting real-world environments. Further, linear feature based representations can be successfully used to improve the performance of related algorithms.

FIG. 1 illustrates an example approach. Box 10 represents acquiring sensor readings. A sensor may provide data in the form of a 3D point cloud data. In some examples, a 3D representation may be projected onto a plane to obtain a 2D representation of an environment, or a sensor may provide 2D data. The data may comprise range data, for example distance measurements obtained using any appropriate method, including laser range-finding.

Box 12 represents application of a linear feature detection algorithm, such as a locally adaptive linear segmentation algorithm. The algorithm receives the 3D point cloud and outputs identified linear features, in this example lines. Box 16 represents a linear feature tracking algorithm, receiving the current set of linear features, and outputting updated tracked linear features and linear feature mapping. Box 14 represents output tracked linear features, which may be used to track objects, or provided to other processes.

Locally Adaptive Linear Segmentation

A point set, such as 2D or 3D data from a sensor, is segmented into a set of regions corresponding to linear features such as line segments or planes. Novel algorithms were developed that are more robust to sparse and noisy data. A novel method was used for performing nearest-neighbor computations. By adapting to the local geometry of the data, a linear feature detection algorithm can robustly deal with, for example, a sparse collections of sensor data points.

Segmentation quality was improved by performing an additional linear feature growing step. This extends regions within the segmentation to include points whose normal calculation is adversely affected by sparseness or noise, but which are consistent with accepted line segments and the extension thereof.

The segmentation algorithm described in Rabbani et al. (T. Rabbani, F. A. van den Heuvel, and G. Vosselmann, "Segmentation of point clouds using smoothness constraint", in IEVM06, 2006), previously used for segmenting smooth curves, can be adapted for use with examples of the present invention. The algorithm can be split into two phases, and a high-level outline is presented in Table I below. In the first phase, the point cloud is analyzed at every point by first finding the nearest neighbors to that point, fitting a plane through those neighbors, and then computing the normal vector (an empirical normal) and residual of the fit of the points to the plane.

In the second phase, the points are segmented into regions. This is done in a greedy fashion, examining each point in order of best residual fit, and growing the region for that point. A region is grown (in principle) by examining each neighbor $p_j$ of each point $p_i$ within that region, and including $p_j$ into the region if the normal vector $v_{nj}$ is similar in orientation to the normal vector $v_{ni}$. Other algorithms may be used.

A similar normal may be one within a certain angular range of a first normal orientation, for example within ±θ, where θ may be 20°, 10°, 5°, or some other angular value.

Both phases of this algorithm rely heavily on the set of nearest neighbors. For dense point clouds, a standard algorithm for finding nearest neighbors appears to be sufficient, because those neighbors result in both good normal estimation and also provide good candidates for the process of region growing. However, for sparse, noisy data sets this is not the case. A standard nearest neighbor calculation will not typically fulfill either of these roles well.

TABLE I

Point Segmentation Algorithm

| Stage | Point Segmentation Algorithm |
|---|---|
| 1: start | Acquire sensor data as point cloud P, and provide to algorithm |
| 2: calculate normals and residuals | Use either a set of nearest neighbors or fixed distance neighbors, calculate the empirical normal by fitting a line or plane, calculate residual of the sampled points |
| 3: region growing | Cluster points that are both locally connected (using neighbors) and have normals that do not differ significantly |
| 4: output | Return a set of regions R |

Locality-Based Neighborhood Calculation

A locality-based neighborhood algorithm was developed to reduce the problems caused by noisy and sparse data in the neighborhood computation. Example algorithms allow the selection of a point's neighbors to depend on the local configuration of points. However, this local configuration is detected (in practice) as a function of the point's neighbors.

Figure 2:
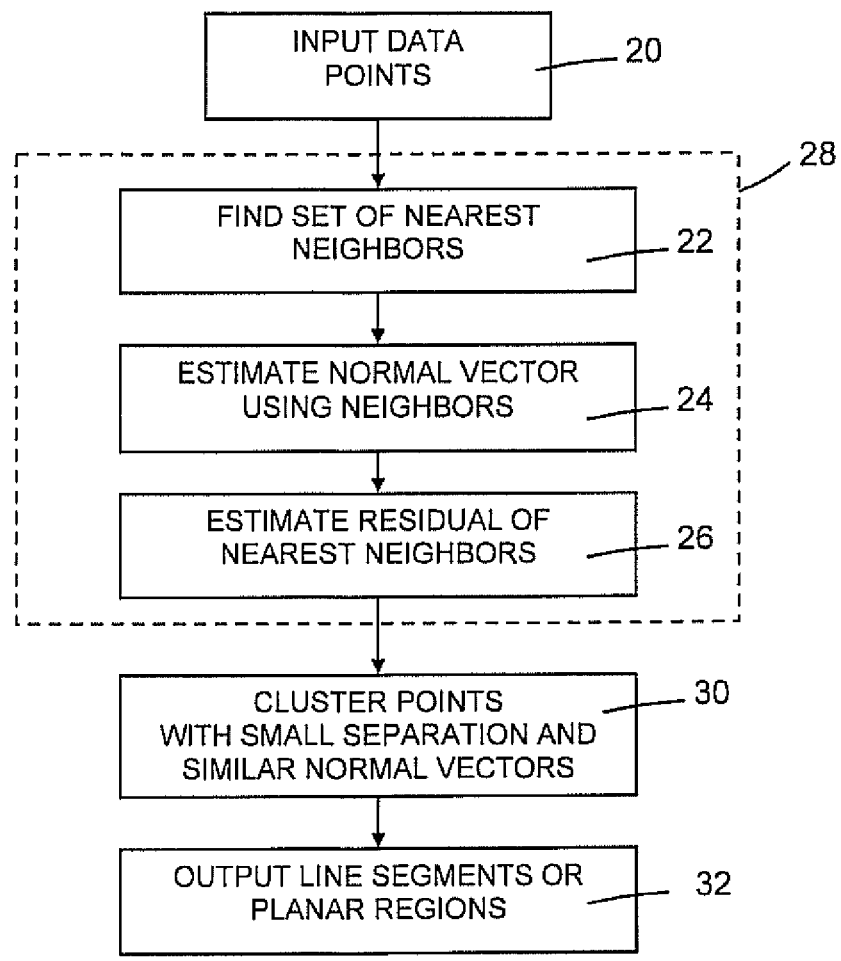
FIG. 2 illustrates a method of finding linear features within sensor data.

FIG. 2 shows a flow chart of an example method. Box 20 corresponds to acquisition of data, such as sensor data, and provision to a linear feature identification algorithm. Box 28 (dashed) represents identification of normal vectors for each point, using the following approach. Box 22 corresponds to finding a sampled set of nearest neighbors for each data point considered. Box 24 corresponds to estimating a normal vector for the sampled set of nearest neighbor data points, for example by fitting of a local linear feature such as a line or plane to the sampled set. Box 26 corresponds to estimating residuals for the sampled set.

Box 30 represents clustering points having similar normal vectors and which are locally connected, for example proximate to each other (such as nearest neighbors, or within a distance function). The distance function may be locally adjustable, for example extending further in an elongation direction of an already determined linear cluster. In some examples, this approach starts with a data point having the smallest residuals (see Box 26). Box 37 corresponds to outputting a linear feature, such as line segment or plane, resulting from the clustering of Box 30.

An iterative algorithm was developed that uses an adaptive local distance function $D_i(p_1, p_2)$ to define the distance between points $p_1$ and $p_2$ at iteration i. An adaptive distance function can be parameterized by a scalar $\alpha_{Di}$ and the orthogonal vectors $v_{ni}$ and $v_{pi}$, where $v_{ni}$ is the empirically calculated normal vector for point $p_i$, and $v_{pi}$ corresponds to the principal dimension for point $p_i$. The distance function may be defined as $$D_i = (\alpha_{Di}((p_2-p_1) \cdot v_n)^2 + 1/\alpha_{Di}((p_2-p_1) \cdot v_p)^2)^{1/2}. \quad (1)$$

The distance function represents the distance between the two points calculated as a function of the distance along primary and normal dimensions, but with those measurements scaled by $\alpha_{Di}$. This allows for the distance to be adaptive to the local configuration.

Experiments showed that a scale factor that is a function of the eigenvalues of the empirical covariance matrix (alternatively, the singular values of the empirical data matrix) worked well. This is intuitively appealing because the eigenvectors corresponding to those eigenvalues are themselves $v_{pi}$ and $v_{ni}$. The scale factor used was $$\alpha_{Di} = (\lambda_{max}/\lambda_{min})^{1/2}. \quad (2)$$

This has the effect of stretching the neighborhood around point $p_1$ based on the linearity of the points already identified as neighbors, because points that have large normal components are penalized more than points that have large primary (tangent) components. The form of the distance function implies that boundary regions of constant distance take the form of ellipses, rather than circles as Euclidean distance would have. The algorithm starts by analyzing a small local neighborhood around point $p_i$, and increasing the size n of the neighborhood set N with each iteration.

The iterative algorithm for computing neighborhood set N and normal $v_n$ for point $p_1$ is given in Table II below. From the resulting set of points and the normal vector, it is straightforward to calculate the residual, for example as explained in Rabbani et al., and so this algorithm can serve as a drop-in replacement for the normal and residual calculation in the overall segmentation algorithm.

This approach is a general method for grouping points based on local features, and can be extended to 3D data in a straightforward way.

TABLE II

Locality-based Neighborhood Algorithm

| Stage | Locality-based Neighborhood Algorithm |
|---|---|
| 1: Initialization | init: $v_{p0} = (0,1)$, $v_{n0} = (1,0)$, $\alpha_{D0} = 1$, $n_0 = n_{init}$ |
| 2 | for i = 1:n |
| 3 | find set $N_i$ of n nearest neighbors using distance function $D_{i-1}$. |
| 4 | Return a set of regions R |
| 5 | compute $v_{ni}$, $v_{pi}$, $\lambda_{max}$, $\lambda_{min}$ using an eigen-decomposition of the covariance matrix. |
| 6 | set $\alpha_{Di}$ according to Equation (2). |
| 7 | set $n_i \leftarrow 2*n_{i-1}$. |
| 8 | end |
| 9: Return | return $N_n$ and $v_{nn}$ |

Additional Region Growing Through Linear Inclusion

A further aspect of the neighborhood computation is linear inclusion region growing. The concept is to include points into the line segment that are consistent with that line segment in position, even if their computed normal vector would not include them in the segment.

A set R of regions, from the second stage of Table I, has already been labeled as linear segments. Each region in R has of a set of points P, and for each region r the normal $v_{nr}$ and tangent $v_{p_r}$ vectors are computed using the eigen-decomposition method as above. The endpoints $p_{r,e1}$ and $p_{r,e2}$ of the line segment are computed by projecting each point onto the tangent vector and finding the extremes.

An example linear inclusion algorithm is parameterized by two scalar values $\alpha_n$ and $\alpha_l$. A point p not already assigned to any region is added to region r if its normal distance to the line segment is less than $\alpha_n$ and either i) its projection is onto the line segment itself, or ii) its projection is less than $\alpha_l$ from the nearest endpoint.

The outcome of this algorithm is a modified set R' of regions, where each region in the original R may have had points added to it (but none subtracted, and no regions removed).

Experiments

To test the effectiveness of the locality-based neighborhood algorithm, it was tested on a obstacle grid derived from a series of laser range finder scans integrated with localization on a test vehicle in a parking lot.

Figure 3A:
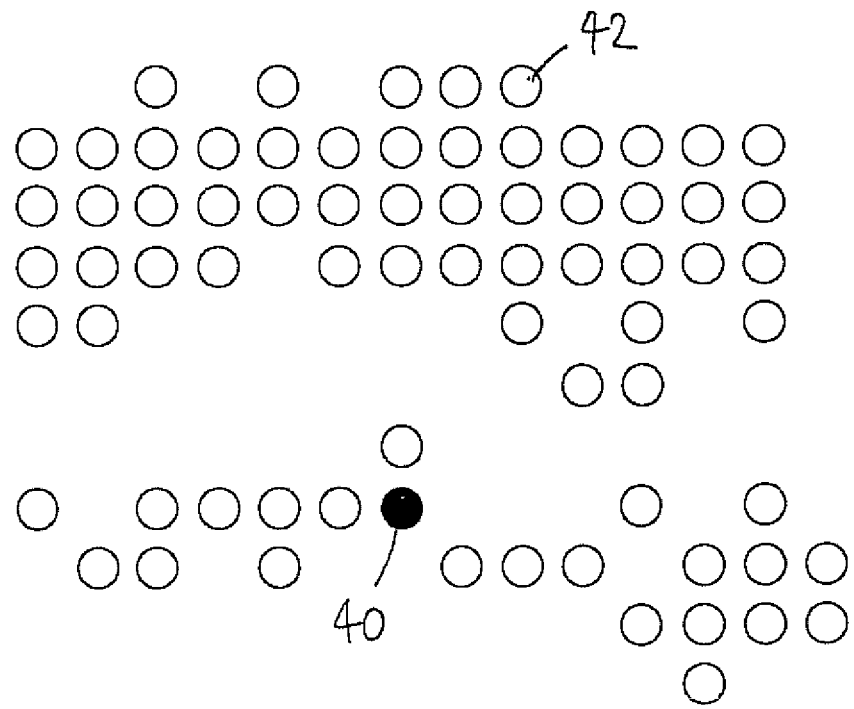
FIGS. 3A-3D show example of the locality-based neighborhood algorithm on neighborhood calculation, taken from actual test data.
Figure 3B:
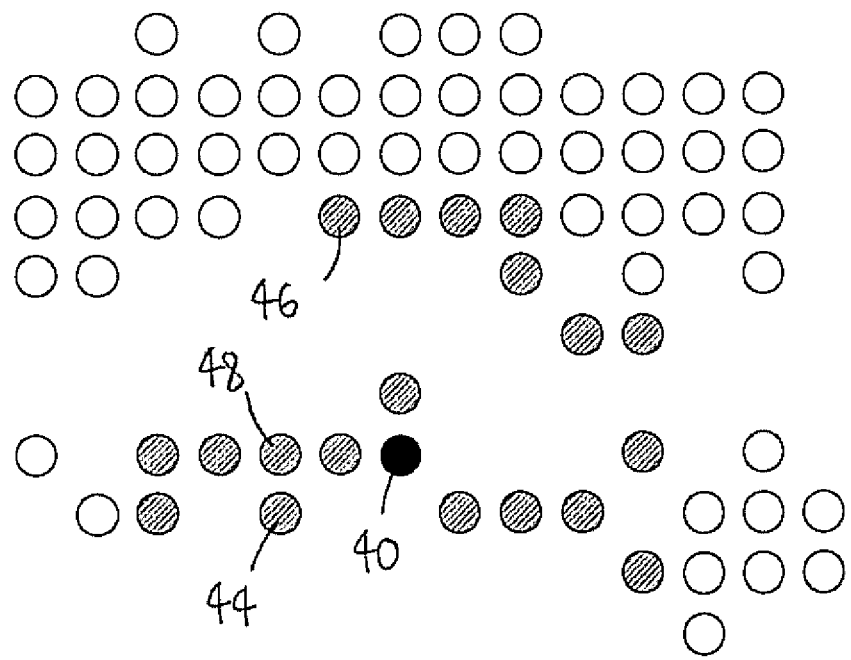
Figure 3C:
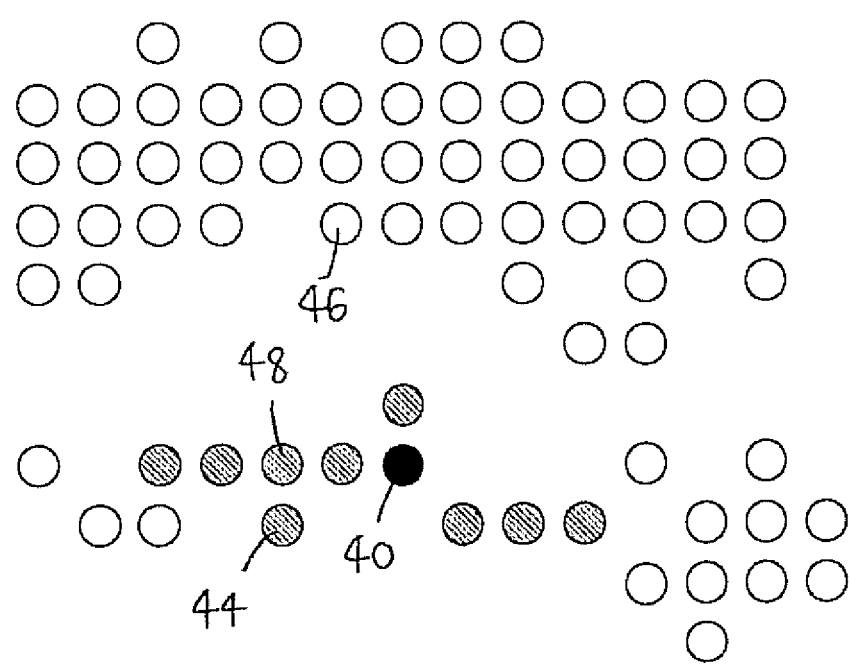
Figure 3D:
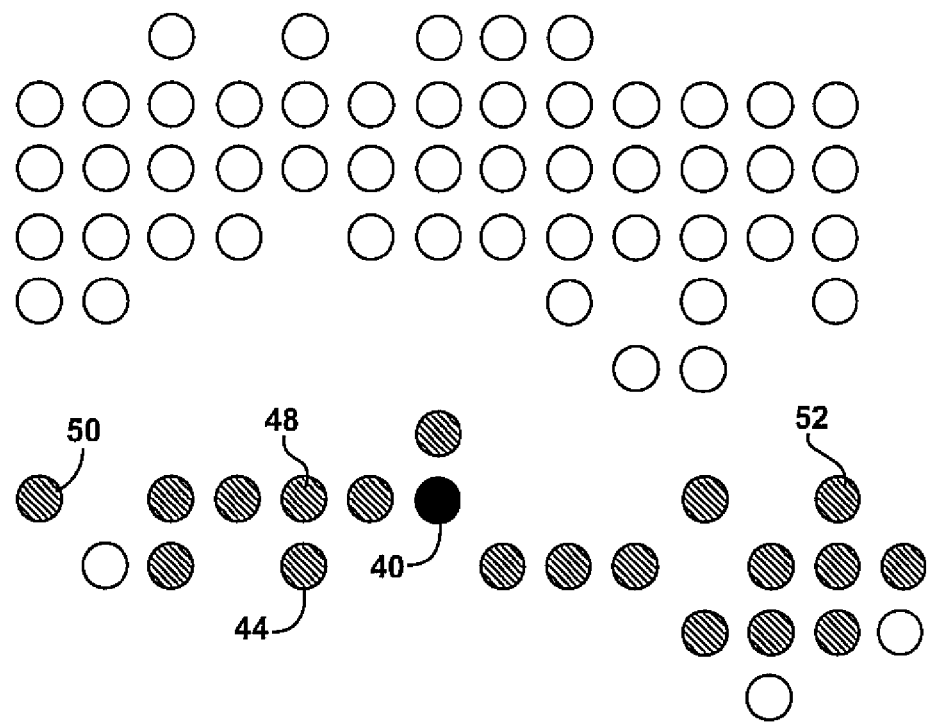

FIGS. 3A-3D show example of the locality-based neighborhood algorithm on neighborhood calculation, taken from actual test data. FIG. 3A shows the set of points such as 42 surrounding the point 40 for which the neighborhood is being calculated. FIG. 3B shows the results of a standard neighborhood calculation (using a Euclidean distance), showing points such as 44 and 48, and also including points such as 46 that are not a part of the local line. FIG. 3C shows an intermediate step in the locality-based neighborhood calculation according to an example of the present invention, showing points such as 48 and 44 properly included in the local line, and not including point 46. FIG. 3D shows the final result of the locality-based neighborhood calculation, showing inclusion of points such as 50 and 52 within the local line.

FIG. 3B shows that the traditional method is ill-suited to such sparse data, the resulting neighborhood results in a poor fit to the normal vector, and a very high residual. The locality-based algorithm of FIGS. 3C and 3D, however, adjusts its distance metric to include more co-linear points and results in a much better neighborhood.

Figure 4A:
FIGS. 4A-4C compares the effect of the neighborhood computation on the segmentation algorithm.
Figure 4B:
Figure 4C:
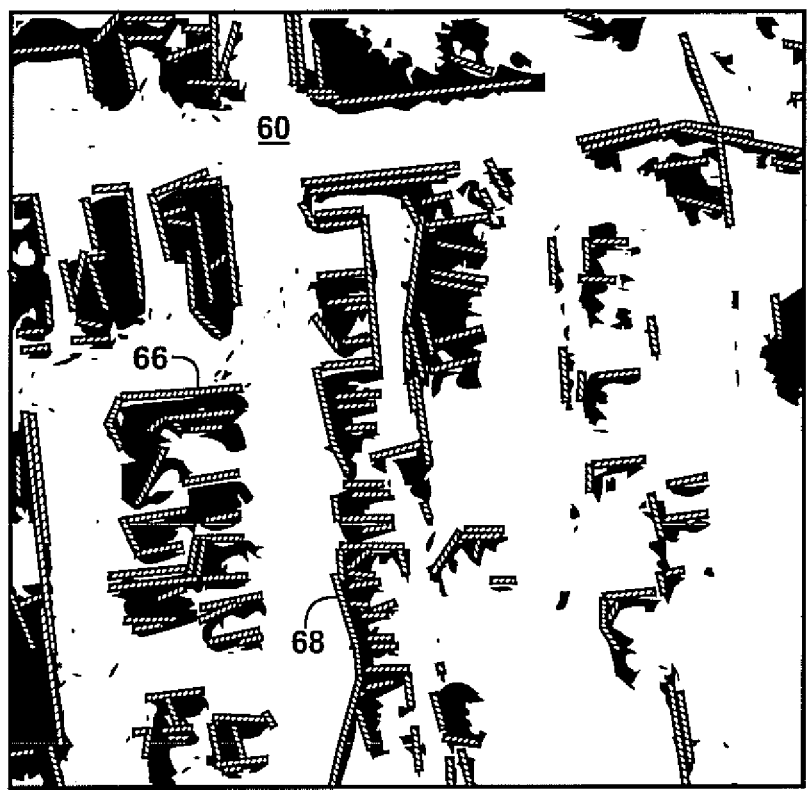

FIGS. 4A-4C show examples of the effect of the locality-based neighborhood algorithm, on the final results of the segmentation algorithm. FIG. 4A shows the input, which is a portion of an obstacle map 60 created from laser range finder data in a parking lot.

FIG. 4B shows the final set of lines selected by the segmentation algorithm when the standard neighborhood calculation was used, including lines such as 62 and 64.

FIG. 4C shows the final set of lines selected by the segmentation algorithm when the locality-based neighborhood algorithm was used, including many lines such as 66 and 68. There were no other differences in the two algorithms, and all parameter settings were identical. These results are typical of the entire obstacle map. All parameter settings were identical between trials, only the neighborhood computation differed. The locality-based algorithm results in a much larger set of lines found, with very few false positives.

Tracking Dynamic Line Segments

Using an algorithm for finding linear segments from point data, the correspondence between lines and objects in the environment can be determined. For environments that contain both static and dynamic obstacles, this involves the evaluation of detected lines as indicators of static obstacles, as well as the evaluation and tracking of detected lines through space for dynamic obstacles.

Although methods exist for the evaluation of static obstacles at an even more primitive level (such as obstacle maps), there are often problems with such approaches, especially when dynamic obstacles are also present. First, there is no notion of the continuity of objects. A very well-defined obstacle may contain a hole in the obstacle map due to sensor noise or as an artifact of ray tracing. Second, tracking of dynamic obstacles at a point-level is often difficult due to problems with establishing correspondences between any two points. Moving to a slightly higher primitive (lines) allows for a much better evaluation and model of motion. However, by staying at a relatively simple level, a range of different obstacle types can be modeled, and the same model can be used for both static and dynamic obstacles.

Figure 5:
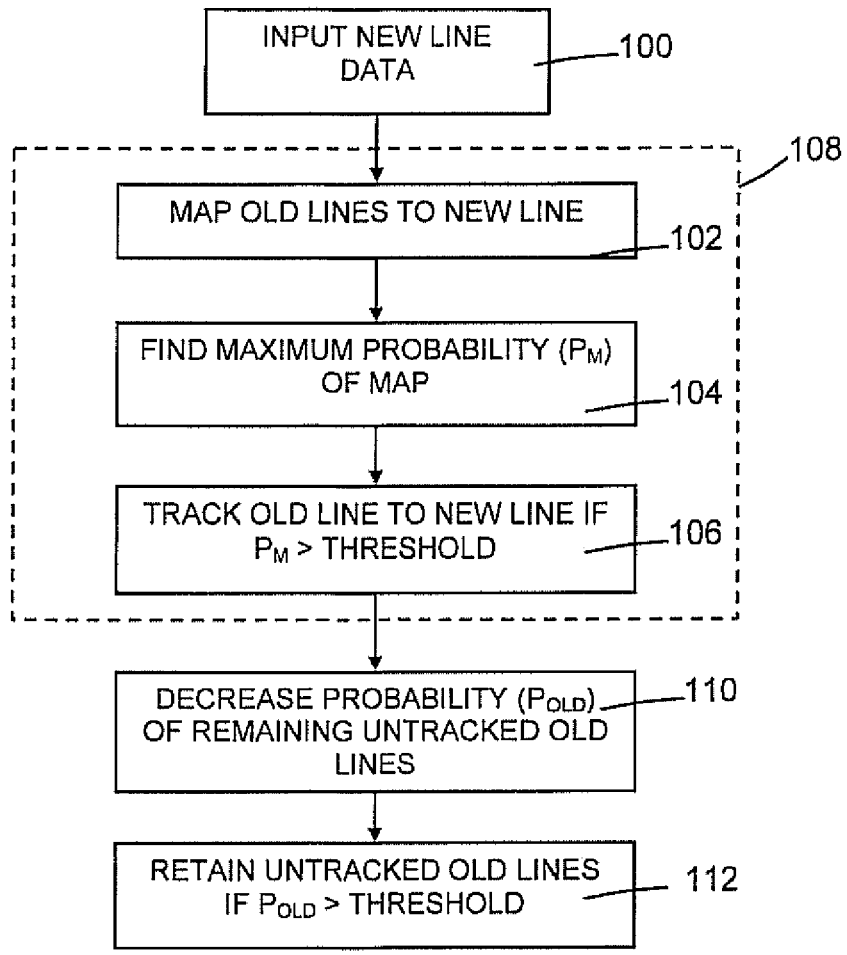
FIG. 5 illustrates a method of tracking linear features within a representation of an environment.

FIG. 5 illustrates a possible approach. Box 100 represents receiving new linear feature data, in this example line data but which may also be plane data. Box 108 represents tracking old lines to new lines, as follows. Box 102 represents mapping old lines to new lines, for each new line. Box 104 represents determining a mapping probability ($P_m$) for the mappings of box 102, and identifying a maximum mapping probability and corresponding most likely mapping. Box 106 represents retaining the mapping found in box 102 if the mapping probability is above a predetermined threshold, and is greater than other possible mappings. Box 110 represents decreasing the line probability of remaining old lines (more generally, decreasing the feature probability of remaining linear features), and Box 112 represents including the old lines in the present set of tracked lines only if the probability $P_{old}$ remains above a second predetermined threshold.

An algorithm was developed for tracking dynamic (and static) line segments. The algorithm uses a simple model of the motion of lines, which takes the form of a (probabilistic) mapping from a line segment at one time step to a line segment at the next time step. A probabilistic approach was developed to address to the problems faced when attempting to track both static and dynamic obstacles. A side effect of using this mapping is that correspondences can be maintained between line segments across many time points.

An example algorithm for tracking line segments treats a present set of detected lines as a measurement to be incorporated into an existing body of evidence. The algorithm also allows for the (gradually decaying) persistence of well-established obstacles, even in the absence of new supporting measurements.

Table III below illustrates the general structure of an example algorithm. A set of potential new lines is generated, which is equal to the set of measurements. The potential new lines may be identified in present sensor data using a line detection algorithm. This is a source of bias towards relying on the most present measurements. Iterate over all of the lines from the previous time step, the probability of the potential new lines is updated based on the computed mapping. During this process, the highest probability mapping is also recorded, which is called a correspondence between line segments. If a potential new line has high enough probability, it is carried forward. Finally, the persistence of well-established lines is computed.

Because lines are such a simple primitive, it is relatively straightforward to define a mapping $\Phi(l_i, l_j)$ from a line segment $l_i$ at time t−1 to a line segment $l_j$ at time t. The same motion model can be used for all lines in the image, whether they correspond to static or dynamic obstacles, and regardless of the type of obstacle.

A model may not able to leverage any of the knowledge of motion that a model of a more specific object would have. If particular object types are detected, these may be tracked using more specific models of motion. However, in experiments a simple approach using line segments performed adequately without the need for specific object models.

The mapping between line segments $l_i$ and $l_j$ sets three scalar parameters: distance $d_{i,j}$, rotation $\theta_{i,j}$, and stretch $\beta_{i,j}$: $<d_{i,j}, \theta_{i,j}, \beta_{i,j}> = \Phi(l_i, l_j)$.

For each line segment $l_x$, the center $c_x$, the angle $\theta_x$, and the length $z_x$ are computed. The center and length are computed by standard formulae. For the angle, the angle can be required to be in $[0,\pi)$, which is possible because line segments are symmetric with respect to a rotation of $\pi$.

The distance is the Euclidean distance between the center points $c_i$ and $c_j$, so $d_{i,j} = \sqrt{(c_{i,x} - c_{j,x})^2 + (c_{i,y} - c_{j,y})^2}$. The rotation is $\theta_{i,j} = \theta_j - \theta_i$. The stretch is the ratio of the lengths, $\beta_{i,j} = z_j/z_i$.

The computation of maps can be used both for keeping track of the correspondences between line segments at successive time steps, and also for computing the probability of line segments given measurements. A multivariate normal probability density function over the mappings is defined, assuming that each variable is independent with respect to the others. Thus, means ($\mu_d, \mu_\theta, \mu_\beta$) and standard deviations ($\sigma_d, \sigma_\theta, \sigma_\beta$) are defined, which are captured in the variables $\mu_\Phi$ and $\Sigma_\Phi$.

To account for the wide variance in ranges over the variables, scaling factors ($\gamma_d, \gamma_\theta, \gamma_\beta$) are introduced for each variable. Further, stretch is non-symmetric about 1, so we used $\max(\beta, 1/\beta)$. To summarize, the map for lines $l_i$ and $l_j$ had a multivariate normal probability density function of the three (modified) variables $$(\gamma_d d_{i,j}), (\gamma_\theta \theta_{i,j}), (\gamma_\beta \max(\beta_{i,j}, 1/\beta_{i,j})) \square N_p(\mu_\Phi, \Sigma_\Phi). \quad (3)$$

The selection of parameters defining the normal distribution and scaling factors is highly problem dependent, although tracking results were fairly robust to changes in these settings.

TABLE III

Tracking Line Segments over Time

| Stage | Tracking Line Segments over Time |
|---|---|
| 1: Input stage | set of old lines $L_{t-1}$, set of measurements $M_t$ |
| 2: initialize | $L_t = \emptyset$ |
| 3 | for each measurement $m \in M_1$ |
| 4 | potential new line $l_x \leftarrow m$ |
| 5 | for $l \in L_{t-1} \cup l_{bont}$ |
| 6 | find map $\Phi(l, l_x)$ |
| 7 | update probability of $l_x$ (Equation 4) |
| 8 | if highest probability map, update correspondence |
| 9 | if $pr(l_x \mid m_t \ldots m_1) > \gamma$ |
| 10 | set $L_t \leftarrow L_t \cup l_x$ |
| 11 | record correspondence |
| 12 | for $l \in L_{t-1}$, if $l$ does not have a correspondence |
| 13 | if persistence $pr(l \mid m_t \ldots m_1) > \gamma$ |
| 14 | $L_t \leftarrow L_1 \cup l$ |
| 15: output | output: $L_t$ |

Probabilistic Tracking Over Time

An example algorithm uses a Bayesian approach to integrating new measurements with previous evidence. The line probability of a line $l_x$ given all sensor measurements is $$pr(l_x \mid m_t \ldots m_1) = \sum_{l_o} pr(l_x l_o \mid m_t \ldots m_1) \quad (4)$$

$$= \alpha \sum_{l_o} pr(m_t \mid l_x l_o m_{t-1} \ldots m_1)$$

$$pr(l_x l_o \mid m_{t-1} \ldots m_1)$$

$$= \alpha pr(m_t \mid l_x) \sum_{l_o} pr(l_x \mid l_o) pr(l_o \mid m_{t-1} \ldots m_1)$$

where conditional independencies in the first two probabilities is used to simplify the expression. The third probability in this expression is the probability of the old line $l_o$ carried through from the last time step. For planes as linear features, analogous terms can be used for the feature probabilities.

The first probability reflects the probability that a particular measurement is generated, given that there is a line. The existence of a line is assumed, and the probability can be computed as a function of the linearity of the measurement. Each m corresponds to a region r found above, and the line's $\alpha_D$ computed above is the ratio of the largest to the smallest eigenvalues. The $\alpha_D$ is passed through a scaled sigmoid function $P(\alpha_D)$ (Equation 5), with parameters $\mu_P$ and $\tau_P$ which determining its midpoint and slope respectively.

Therefore, for a measurement with eigenvalue ratio $\alpha_D$, the probability $$pr(m_t \mid l_x) = P(\alpha_D) = \frac{1}{1 + e^{-(\alpha_D - \mu_P)/\tau_P}} \quad (5)$$

The second probability in Equation 4 is a function of the mapping $\Phi$ from the old line $l_o$ to the new line $l_x$, and so corresponds to the probability density function defined in Equation 3.

Even though this equation defines a density, because we are only summing over a finite number of old lines and then normalizing, this density can be treated as a valid component of the probability computation. Therefore, for a map $\Phi$ between lines $l_o$ and $l_x$ with probability density $p_\Phi$, the probability $$pr(l_x|l_o) = c_\Phi p_\Phi. \tag{6}$$

where $c_\Phi$ is a constant chosen so that $c_\Phi p_\Phi \leq 1 \; \forall \Phi$.

In each iteration, there are some new lines that are genuinely new, not tracked from old lines. This may be due to motion of a vehicle or other sensor support, other motion, or sensor limitations. A line-based model can account for this possibility. In this case, there is no old line, so a special old line $l_{born}$ is introduced that represents a line appearing without prior knowledge of it. A constant probability $p_{born}$ can be used:

$$pr(l_x|l_{born}) pr(l_{born}|m_{t-1} \ldots m_1) = p_{born}. \tag{7}$$

This old line is included in the sum over all old lines in Equation 4.

Line Persistence

Examples of the present invention allow lines to persist in the absence of measurements. For instance, if dynamic obstacles move and block the measurement of a static obstacle (represented by one or more lines), line persistence allows representation of the static obstacle persist. For a tracking algorithm such as shown in Table III, line persistence may apply only to those old lines that have not been mapped to new lines.

One approach would continue to use Bayesian updating. However, this approach may require a sensor model that includes all of the various reasons for the absence of a measurement.

A simpler approach can be used. A function is defined that decays the line probability (more generally, a feature probability for a linear feature) over time, in the absence of measurements. In some examples, highly probable lines decay slowly, and less probable lines decay faster. For old line $l_o$ and new proposed line $l_x$ (in the same position), let $$pr(l_x|m_t \ldots) = pr(l_x|m_{t-1} \ldots) - c_p(1 - pr(l_x|m_{t-1} \ldots))^{e_p} \tag{8}$$

where $c_p$ and $e_p$ are constant parameters, where $c_p$ is typically small (0.01-0.1) and $e_p$ is typically 2 or 3. This function fulfills the desired behavior for line persistence.

Figure 6A:
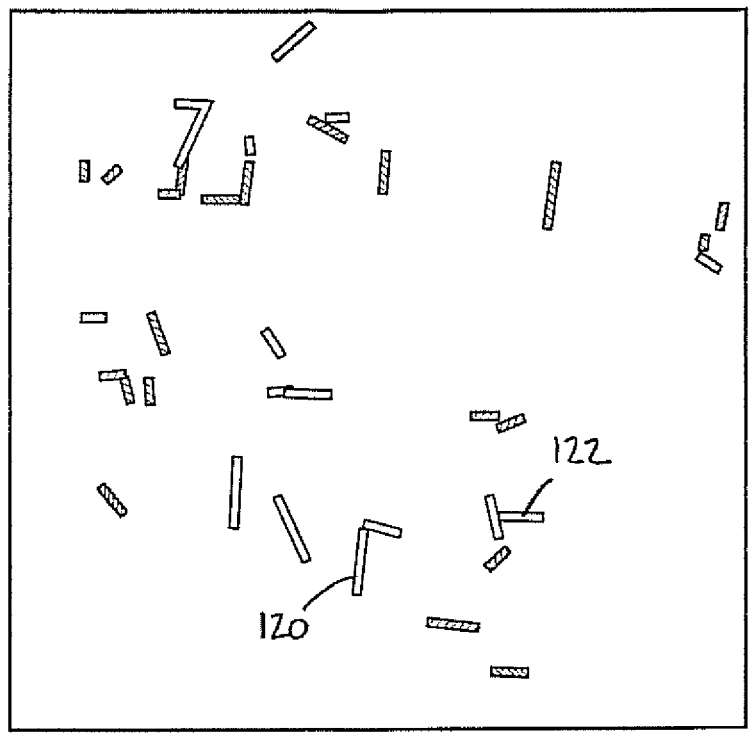
FIGS. 6A-6C shows periodic snapshots of dynamic linear feature tracking during a series of 20 measurements, where the stability of the linear features is demonstrated for both static and dynamic obstacles.
Figure 6B:
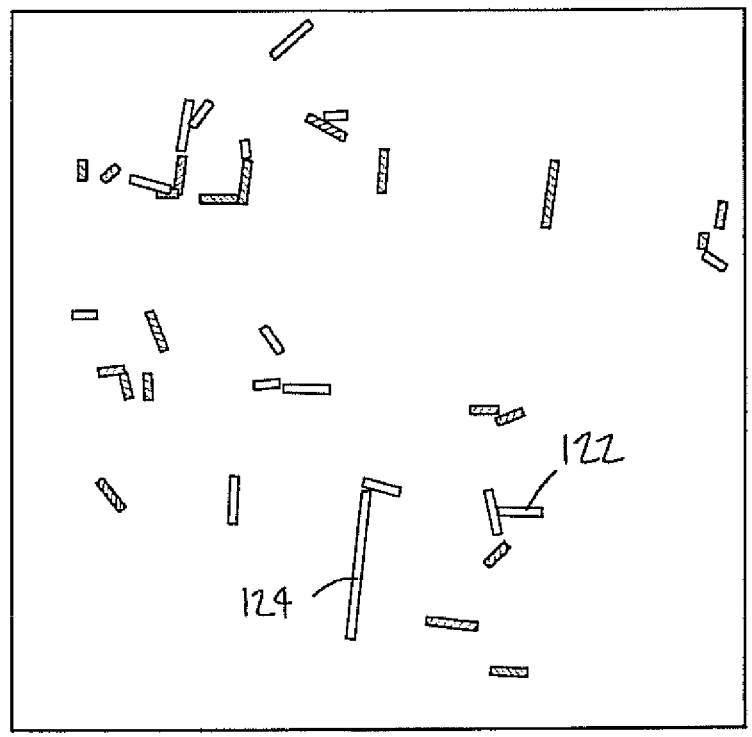
Figure 6C:
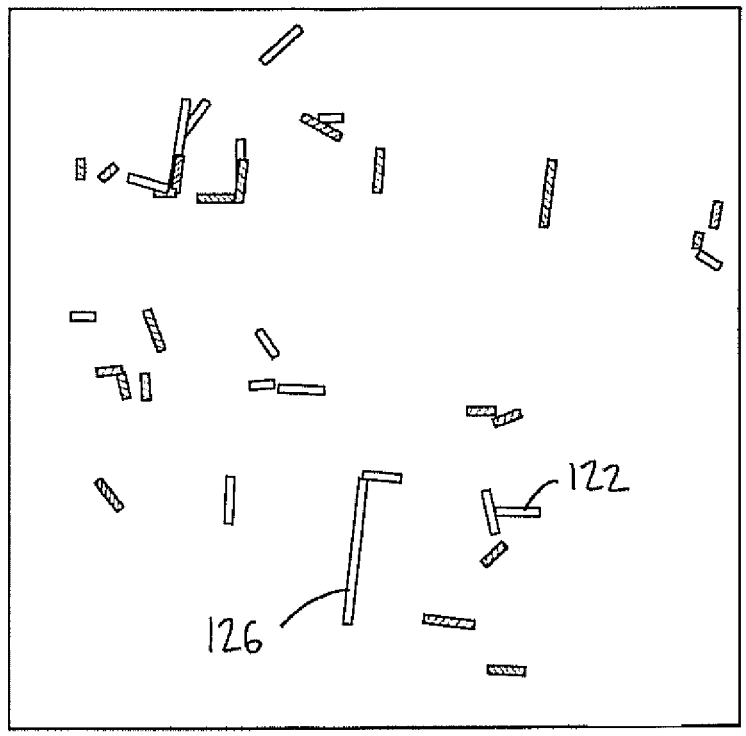

FIGS. 6A-6C show some results of a line tracking algorithm, applied to a parking lot scene containing a number of static obstacles as well as a dynamic obstacle (a bus moving through the environment). The data for this experiment was a series of instantaneous (reset at every time step) obstacle maps generated from laser scans. Using this data, line detection and obstacle tracking were run. The resulting tracked line segments were very stable, and the sequence shown is just three snapshots over the course of 20 frames.

FIG. 6A shows lines such as 120 and 122 where 120 represents a dynamic obstacle (in this example, a moving bus) and other lines are generally static obstacles, FIG. 6B shows lines such as 124, showing movement of the dynamic obstacle, and line 122 showing stability of static obstacles. FIG. 6C shows line 126 from the dynamic obstacle and line 122 remaining a stable representation of a static obstacle.

This experiment consisted of 830 frames, and during the course of the experiment the average number of lines being tracked was 105.5/frame. The average number of newborn lines was 5.19/frame, meaning that about 95% of lines were being tracked from one frame to the next.

Free Space Analysis using Ray Tracing

A linear feature based representation of an environment, such as can be obtained using example algorithms of the present invention, can further be used in many applications involving sensory perception and scene modeling.

For example, a linear feature based representation can be used in the task of free-space analysis of the environment. The task of mapping the environment is useful for various robotic applications. A mapping algorithm is used to estimate, at any given time, the most likely obstacle map from the past sequence of sensor readings (accurate localization may be assumed). Environment mapping particularly non-trivial when sensor data are noisy, and/or if the environment contains dynamic obstacles. Under these conditions, the problem of free-space analysis arises, where the goal is to use a measurement model of the sensors to incorporate negative observations into the obstacle-map updates.

A common approach to free-space analysis for laser range-finders is ray-tracing on a discrete grid, with most contemporary implementations using some sort of a probabilistic update to the occupancy grid. Ray tracing simulates laser beams from the robot's location toward observed obstacles and any grid cell that this virtual beam passes through receives a free-space observation that is then used to update the cell's occupancy. Most real-time grid-based mapping is done in 2D, because ray-tracing in 3D is typically computationally prohibitive.

One of the complications in free-space analysis based on ray-tracing is that real sensors frequently return range readings that exceed the real distance to the nearest obstacle. This can happen for a variety of reasons, such as semi-transparency of objects and the change in alignment of the sensor and the object in 3D. Therefore, an obstacle-map update mechanism preferably allows obstacles to persist not only in the absence of positive observations, but also under negative observations. A ray-tracing algorithm for a dynamic environment balances obstacle persistence (allowing obstacles to persist under no or negative observations) against rapidly updating the state of moving objects.

Ray tracing was implemented using linear features A linear feature base scene representation can be used in ray tracing to allow more stable updates to static object, while accurately updating the state of moving objects. A parametric representation of the environment that uses primitives (such as linear features) can be more representative. When points are grouped into linear features, ray tracing is less prone to "punching through" this side of the object. It is further possible to establish correspondence between linear features in consecutive sensor scans, allowing linear features to be tracked between scans, giving accurate state updates for moving objects.

Figure 7A:
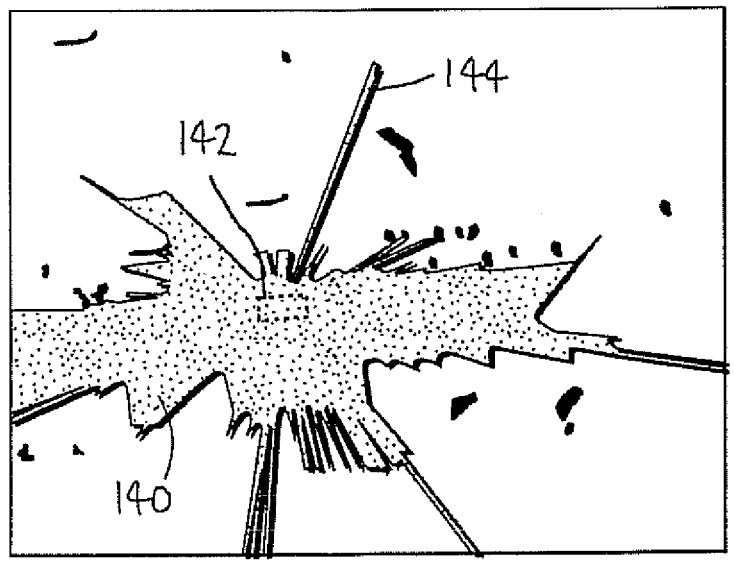
FIGS. 7A-7B show ray tracing using a standard point-based obstacle map and a linear feature augmented (in this case a linear feature augmented) representation respectively, the latter protecting more obstacles from erroneously erasure.
Figure 7B:
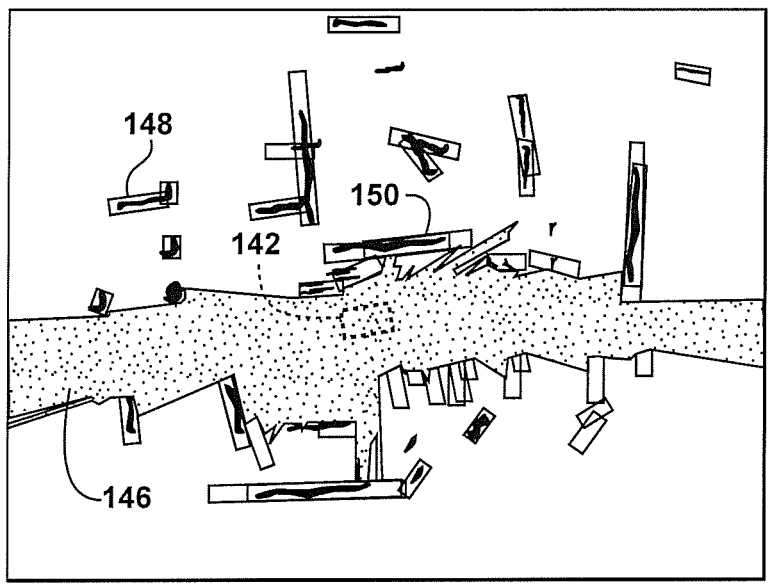

FIGS. 7A-7B illustrates comparison of point-base and linear feature based ray-tracing. Implementation of ray tracing is straightforward using the linear feature detection and tracking algorithms described above. Virtual sensor beams were simulated on a 2D grid from the robot's location and an intersection is computed with a set of linear features as well as the obstacles in the point-based grid, i.e., a virtual beam stops when it hits an observed obstacle point or a linear feature in the present set.

FIG. 7A shows a snapshot of the a standard ray tracing algorithm on a 2D grid, around a vehicle 142 supporting a range sensor. Due to the sensor noise, many of the simulated rays (show in region 140) penetrate solid objects, resulting in false free-space evidence (e.g. beam 144). A robust obstacle-map mechanism may not treat these observations at face value, but uses them in a probabilistic cell update. However, such false observations are nonetheless damaging to obstacle map accuracy.

FIG. 7B shows a snapshot of ray tracing performed on an obstacle map augmented with linear features, in this case lines (the identified lines being indicated by rectangles such as 148 and 150). Many objects are "protected" from erasure by the continuous lines, making this approach more robust to false free-space observations, which gives more complete and accurate map of static obstacles. The region 146 penetrated by the simulated rays is more contained than the region 140 shown in FIG. 7A.

The ray-tracing algorithm was evaluated with linear feature augmentation, and compared to a standard point-base ray tracing algorithm with probabilistic map updates. Overall, this example method showed a considerable improvement in the quality of static maps, while showing a slight degradation in the accuracy of updates to moving objects (especially those far from the robot).

Figure 8A:
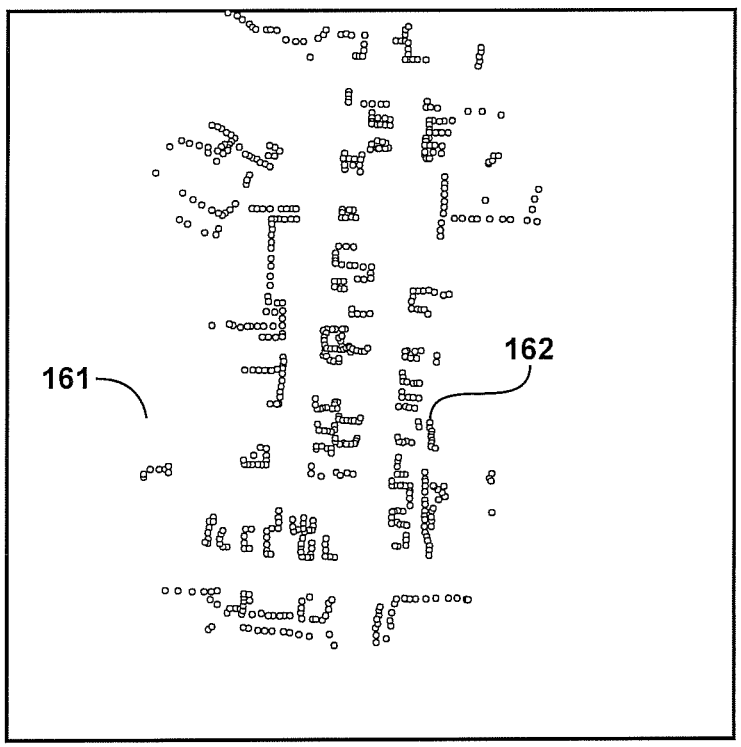
FIGS. 8A-8B shows a further comparison of point-based and linear feature based obstacle maps.
Figure 8B:
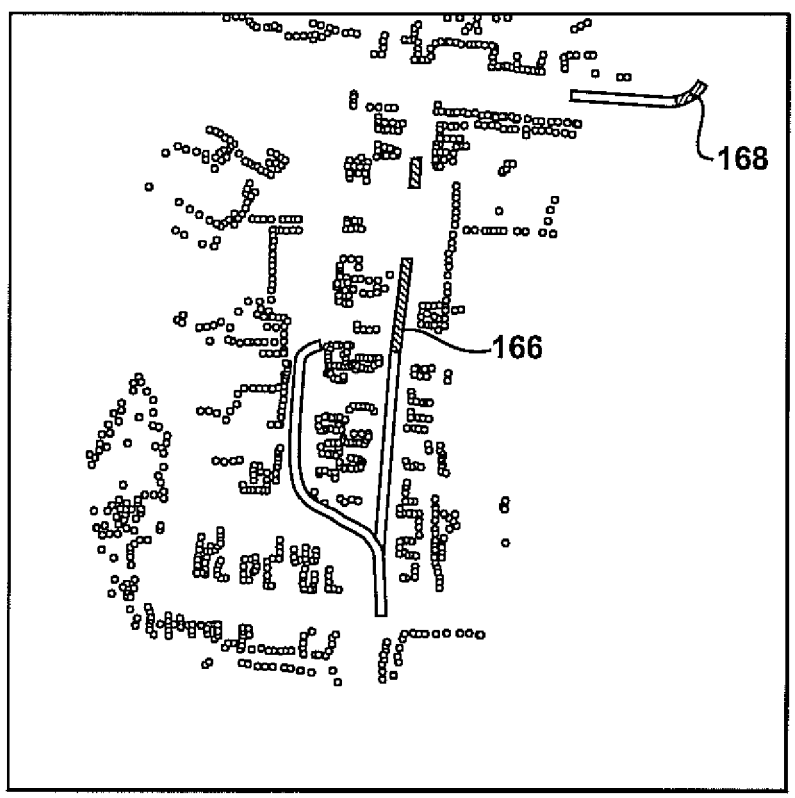

FIGS. 8A-8B show snapshots of obstacle maps (integrated over time) computed for two different experimental runs. The figure presents a graphical comparison of obstacle maps obtained by a linear feature based and a point-based ray-tracer. Both used the same probabilistic mechanism for incorporating positive and negative evidence into the obstacle map. The background of the figure (e.g. 161) represents static obstacles correctly represented by both algorithms. Features such as 162 in FIG. 8A represent static obstacles retained by the linear feature based approach, but erroneously erased by a point-based ray tracer (there are many of these shown in FIG. 8A, and also many in FIG. 8B). Features such as 164 in FIG. 8B represent dynamic obstacles correctly cleared from the map by both algorithms. Features such as 166 and 168 represent dynamic obstacles that were correctly cleared from the map by the point-based algorithm, but were erroneously retained in a linear feature based approach (there are relatively few of these in FIG. 8B).

The environment in FIG. 8A was relatively static, while FIG. 8B shows results for a more dynamic environment with several moving objects. Both figures were obtained in a parking lot using a car equipped with a 3D Velodyne LIDAR and an accurate GPS+IMU pose-estimation system. FIG. 8A shows a single snapshot in time of the obstacle map that evolves over time.

Linear feature based representation of an environment can be greatly advantageous over a point based representation. Linear feature based representations have enough representational power to successfully perform tasks such as dynamic tracking that allow reasoning about real-world environments. Further, linear feature based representations can be successfully leveraged to improve the performance of related algorithms, such as ray-tracing. In computational implementations, a combined linear feature detection/linear feature tracking/ray-tracing algorithm took about 2 seconds per frame to process. The implementation time can be readily reduced to allow real-time applications to be achieved.

For every set of new sensor data obtained, a new set of tracked linear features is determined using both new linear features (found within the sensor data) and a previous set of tracked linear features. New linear features are detected within the sensor data using a locally adaptive algorithm according to an example of the present invention, or alternatively using any other linear feature detection algorithm. Detected linear features are passed to a linear feature tracker which integrates the new linear features with the previous set of tracked linear features. A probabilistic mapping is determined from old linear features to each new linear feature. New linear features that cannot be mapped from old linear features can also be included in the new set of tracked linear features, for example as representing new objects in the environment. Further, persistence of old linear features that are not detected in the new sensor data into the new set of tracked linear features can be allowed, allowing a representation of object permanence even in the presence of sensor obstruction relative to the object. An updated set of tracked linear features is hence obtained using the present sensor data, and previous sensor data (due to the possible inclusion of old linear features). This approach can be repeated for each new set of sensor data obtained, allowing an improved approach to object tracking within an environment.

In some examples of the present invention, the sensor(s) are associated with a vehicle (such as a car, airplane, boat, submarine, and the like), more particularly a land vehicle such as an automobile, truck, and the like. The environment may be the environment of a vehicle, and may comprise roads, other vehicles, and the like.

Examples of the present invention include improved methods of linear feature detection using locally adaptive algorithms used for purposes other than object tracking, including image processing and object identification. Examples of the present invention include line tracking algorithms used with conventional line identification algorithms. Examples of the present invention further include an automated vehicle or other robot including an electronic circuit, such as a computer, operable to steer the vehicle and/or execute path planning using example algorithms of the present invention. For example, algorithms may be executed using a microprocessor within a conventional microprocessor circuit, such as a computer. Examples of the present invention also include digital memory media used to store a representation of an algorithm according to an embodiment of the present invention. Examples of the present invention also include configurations in which the sensor is remote from an electronic circuit used to track objects, and can include, for example, control apparatus for remote control of apparatus, robots, automated vehicles, satellites, and the like.

The invention is not restricted to the illustrative examples described above. Examples described are exemplary, and are not intended to limit the scope of the invention. Changes therein, other combinations of elements, and other uses will occur to those skilled in the art. The scope of the invention is defined by the scope of the claims.

Having described our invention, we claim:

1. A method of tracking static and dynamic objects within an environment, the method comprising:
   acquiring point sensor data in three dimensions related to the environment, the point sensor data including present point sensor data and previous point sensor data;
   identifying present linear features within the present point sensor data;
   tracking previous linear features from a previous set of tracked linear features to the present linear features to determine a position of each present linear feature relative to a previous position; and
   creating a set of tracked linear features, the set of tracked linear features being used to track static and dynamic objects within the environment,
   the set of tracked linear features including:
      present linear features tracked from previous linear features;
      present linear features not tracked from previous linear features; and untracked previous linear features not tracked to present linear features,
the untracked previous linear features being in the previous set of tracked linear features but not identified in the present point sensor data,
each linear feature within the set of tracked linear features having a feature probability,
feature probabilities of the untracked previous linear features being reduced relative to corresponding previous feature probabilities in the previous set of tracked linear features.

2. The method of claim 1, further comprising:
determining mapping probabilities for mapping previous linear features to each present linear feature;
identifying a highest mapping probability; and
tracking the previous linear features to the present linear features if the highest mapping probability is greater than a threshold value.

3. The method of claim 2, the mapping probabilities being expressed in terms of at least one parameter selected from spatial displacement, stretching, and reorientation.

4. The method of claim 1, the feature probability including a contribution correlated with linearity.

5. The method of claim 1, the point sensor data including range data, the set of tracked line features being line segments or planes.

6. The method of claim 1,
the method being performed by a computer located on an automated vehicle.

7. A method of tracking static and dynamic objects within an environment, the method comprising:
acquiring point sensor data in three dimensions related to the environment, the point sensor data including present point sensor data and previous point sensor data;
identifying present linear features within the environment using the present point sensor data obtained from the environment;
identifying mappings of previous tracked linear features to the present linear features to determine a position of each present linear feature relative to a previous position;
determining a feature probability for each present linear feature; and
creating a set of present tracked linear features including the present linear features,
the set of present tracked linear features further including unmapped previous linear features not mapped to present linear features,
the unmapped previous linear features being identified in previous point sensor data but not being identified in the present point sensor data,
the feature probability of unmapped previous linear features being reduced,
the set of present tracked linear features and mappings being used to track static and dynamic objects within the environment.

8. The method of claim 7, an unmapped previous linear feature being removed from the set of present tracked linear features if the associated feature probability is less than a threshold value.

9. The method of claim 7, wherein mapping previous tracked linear features to the present linear features comprises determining mapping probabilities for a plurality of possible mappings, and selecting a mapping with a mapping probability greater than a threshold level.

10. The method of claim 9, the mapping probability being expressed in terms of at least one parameter selected from spatial displacement, stretching, and reorientation.

11. The method of claim 7, the point sensor data including range data obtained using a range sensor, the range sensor being selected from a group of sensors consisting of a lidar sensor, a radar sensor, and a sonar sensor.

12. A method of tracking static and dynamic objects within an environment, the method comprising:
obtaining point sensor data in three dimensions from the environment, the point sensor data including range data;
identifying linear features within the environment using the point sensor data; and
tracking static and dynamic objects within the environment by tracking the linear features to determine a position of each present linear feature relative to a previous position,
wherein the linear features are identified within the point sensor data using a locality-based neighborhood calculation including:
determining a normal vector for each point sensor data point using sampled point sensor data around each point sensor data point; and
clustering proximate point sensor data points having similar normal vectors, proximate data points being selected using a local distance function, the local distance function extending further in an elongation direction of a pre-existing linear cluster.

13. The method of claim 12, the linear features formed by clustering proximate point sensor data points being further extended by:
including point sensor data points having positions consistent with an extension of the linear feature into the linear feature.

14. The method of claim 12, wherein the point sensor data represents a two-dimensional array of range data, and the linear features are line segments.

15. The method of claim 12, wherein the point sensor data represents a three-dimensional array of range data, and the linear features are planes.

* * * * *